United States Patent
Okuno

(10) Patent No.: US 11,842,283 B2
(45) Date of Patent: *Dec. 12, 2023

(54) LEARNING METHOD, COMPUTER PROGRAM, CLASSIFIER, GENERATOR, AND PROCESSING SYSTEM

(71) Applicant: AXELL CORPORATION, Tokyo (JP)

(72) Inventor: Shuji Okuno, Nara (JP)

(73) Assignee: AXELL CORPORATION, Tokyo (JP)

(*) Notice: Subject to any disclaimer, the term of this patent is extended or adjusted under 35 U.S.C. 154(b) by 590 days.

This patent is subject to a terminal disclaimer.

(21) Appl. No.: 16/902,049

(22) Filed: Jun. 15, 2020

(65) Prior Publication Data

US 2020/0394449 A1   Dec. 17, 2020

(30) Foreign Application Priority Data

Jun. 17, 2019 (JP) .................................. 2019-112371
Feb. 18, 2020 (JP) .................................. 2020-025344

(51) Int. Cl.
   *G06N 20/00* (2019.01)
   *G06V 10/764* (2022.01)
   *G06V 10/774* (2022.01)
   *G06V 10/82* (2022.01)
   (Continued)

(52) U.S. Cl.
   CPC ............. *G06N 3/088* (2013.01); *G06F 18/21* (2023.01); *G06F 18/24* (2023.01); *G06N 20/00* (2019.01);
   (Continued)

(58) Field of Classification Search
   CPC ........ G06N 3/088; G06N 20/00; G06N 3/045; G06N 3/047; G06N 3/105; G06F 18/21;
   (Continued)

(56) References Cited

U.S. PATENT DOCUMENTS

2015/0134578 A1   5/2015   Tamatsu et al.
2017/0316281 A1   11/2017   Criminisi et al.
(Continued)

FOREIGN PATENT DOCUMENTS

JP   2015095212 A   5/2015
JP   2019091440 A   6/2019
JP   6569047 B1     8/2019

OTHER PUBLICATIONS

United States Patent and Trademark Office, Updated Filing Receipt in U.S. Appl. No. 16/698,252, filed Nov. 27, 2019, 3 pages; corresponds with JP6596047B.
(Continued)

*Primary Examiner* — John W Lee
(74) *Attorney, Agent, or Firm* — MASUVALLEY & PARTNERS; Peter Martinez

(57) ABSTRACT

A learning method, a learning model, a classifier, a generator, and a processing system are provided, which consider human vision in learning using a machine learning model for an image. The learning method learns a machine learning model that inputs or outputs image data with data for learning that includes both or either one of image data in which a component that is difficult to judge visually is left out and image data in which a noise component that is difficult to judge visually is added at a predetermined ratio.

4 Claims, 16 Drawing Sheets

(51) Int. Cl.
  *G06N 3/088* (2023.01)
  *G06F 18/21* (2023.01)
  *G06F 18/24* (2023.01)

(52) U.S. Cl.
  CPC .......... *G06V 10/764* (2022.01); *G06V 10/774* (2022.01); *G06V 10/82* (2022.01)

(58) Field of Classification Search
  CPC .... G06F 18/24; G06V 10/764; G06V 10/774; G06V 10/82
  See application file for complete search history.

(56) References Cited

U.S. PATENT DOCUMENTS

2018/0293496 A1* 10/2018 Vogels ................ G06F 18/2413
  2019/0138838 A1   5/2019 Liu et al.
  2019/0147333 A1   5/2019 Kallur Palli Kumar et al.
  2020/0057824 A1*  2/2020 Yeh .......................... G06F 30/13
  2020/0242736 A1*  7/2020 Liu .......................... G06N 3/045

OTHER PUBLICATIONS

Senzaki, Y. et al., "Negative Side Effect of Adversarial Training in Deep Learning and Its Mitigation," Computer Security Symposium 2017, Oct. 23-25, 2017, 8 pages.

JP Notice of Reasons for Refusal dated Nov. 30, 2021 in JP2020-025344.

Miyazato et al., "Improving the robusteness of neural networks to adversarial examples by reducing color depth of training inage data", IEICE Tech. Rep., vol. 118, No. 494, EMM2018-109, pp. 95-100, Mar. 2019.

* cited by examiner

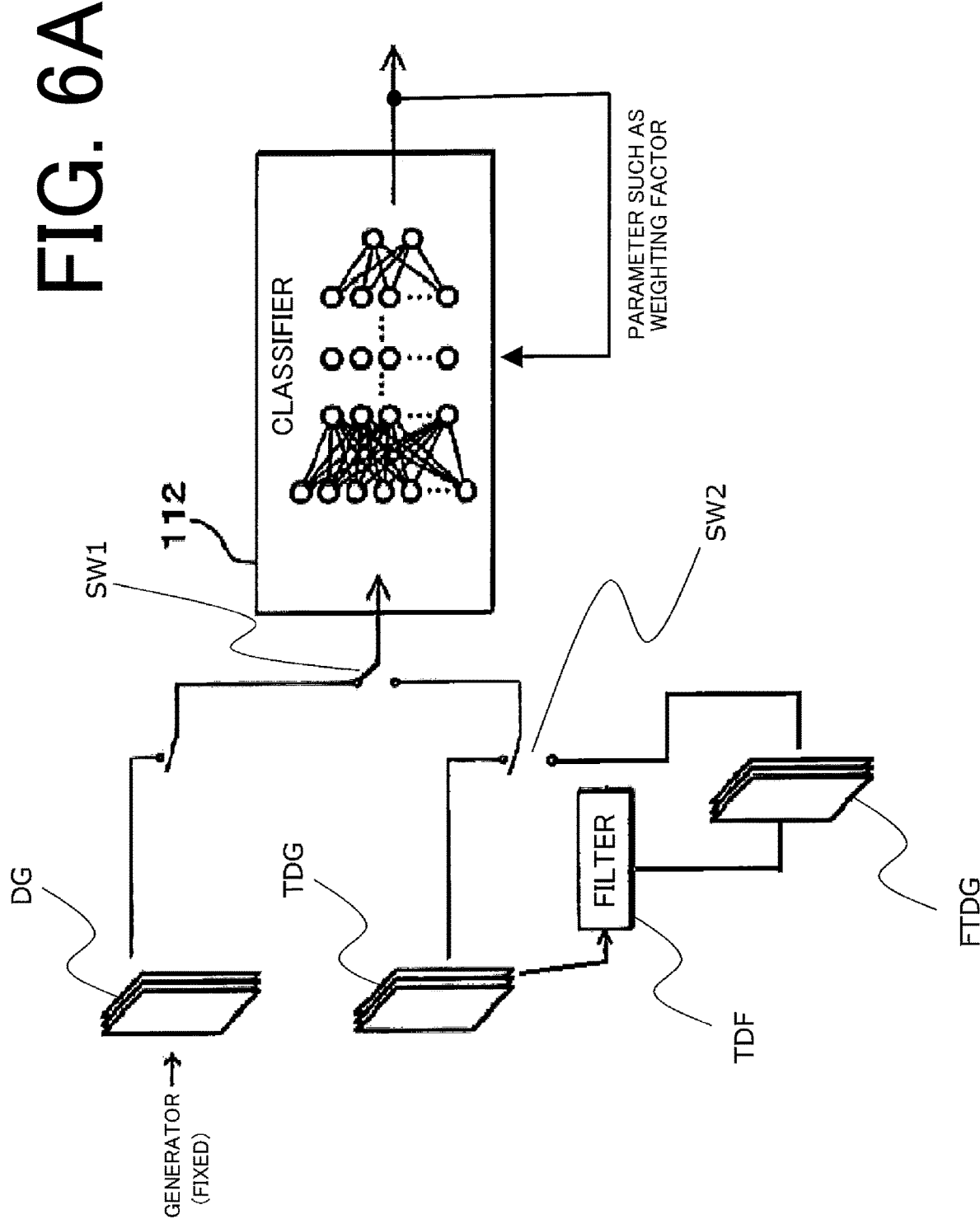

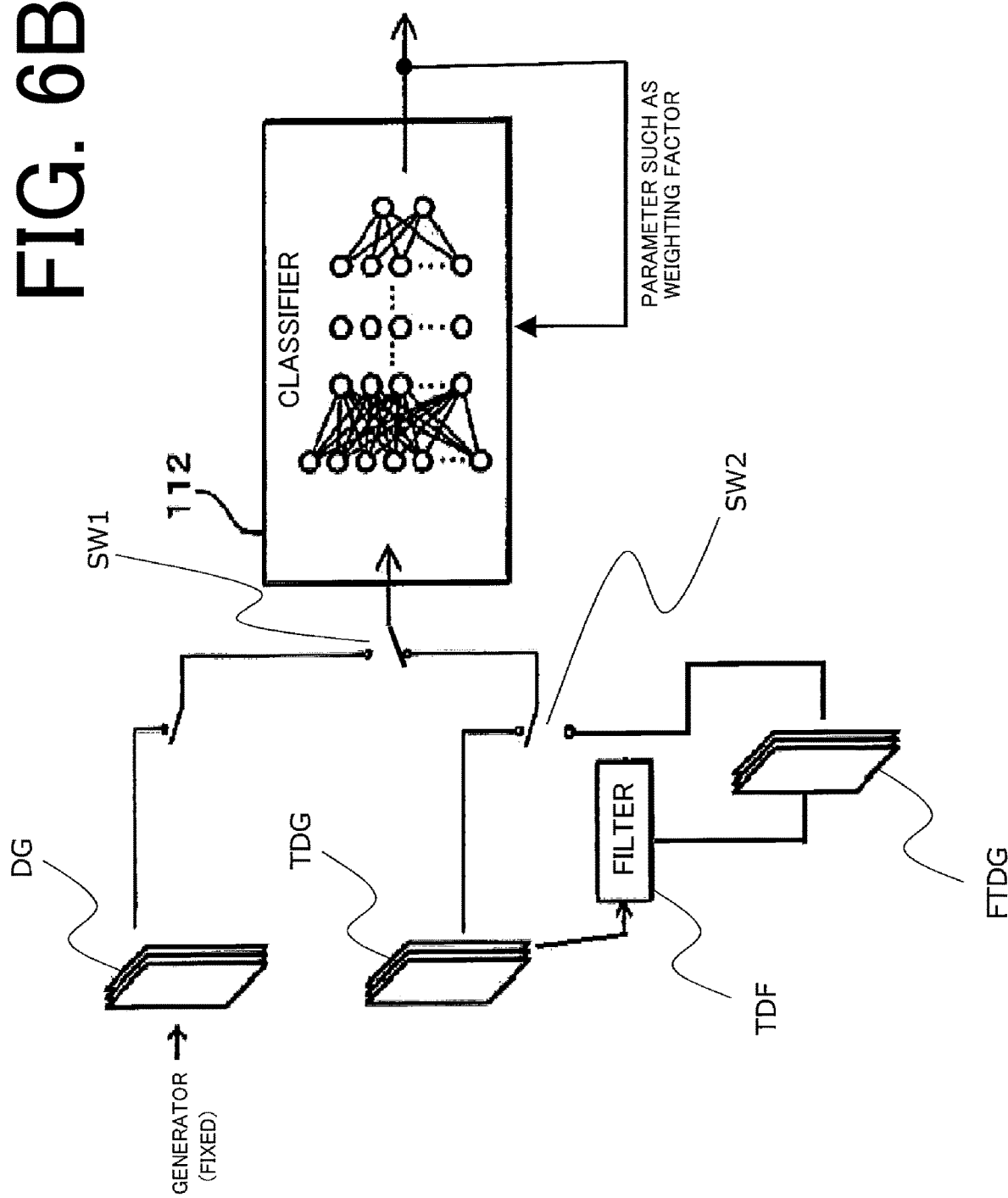

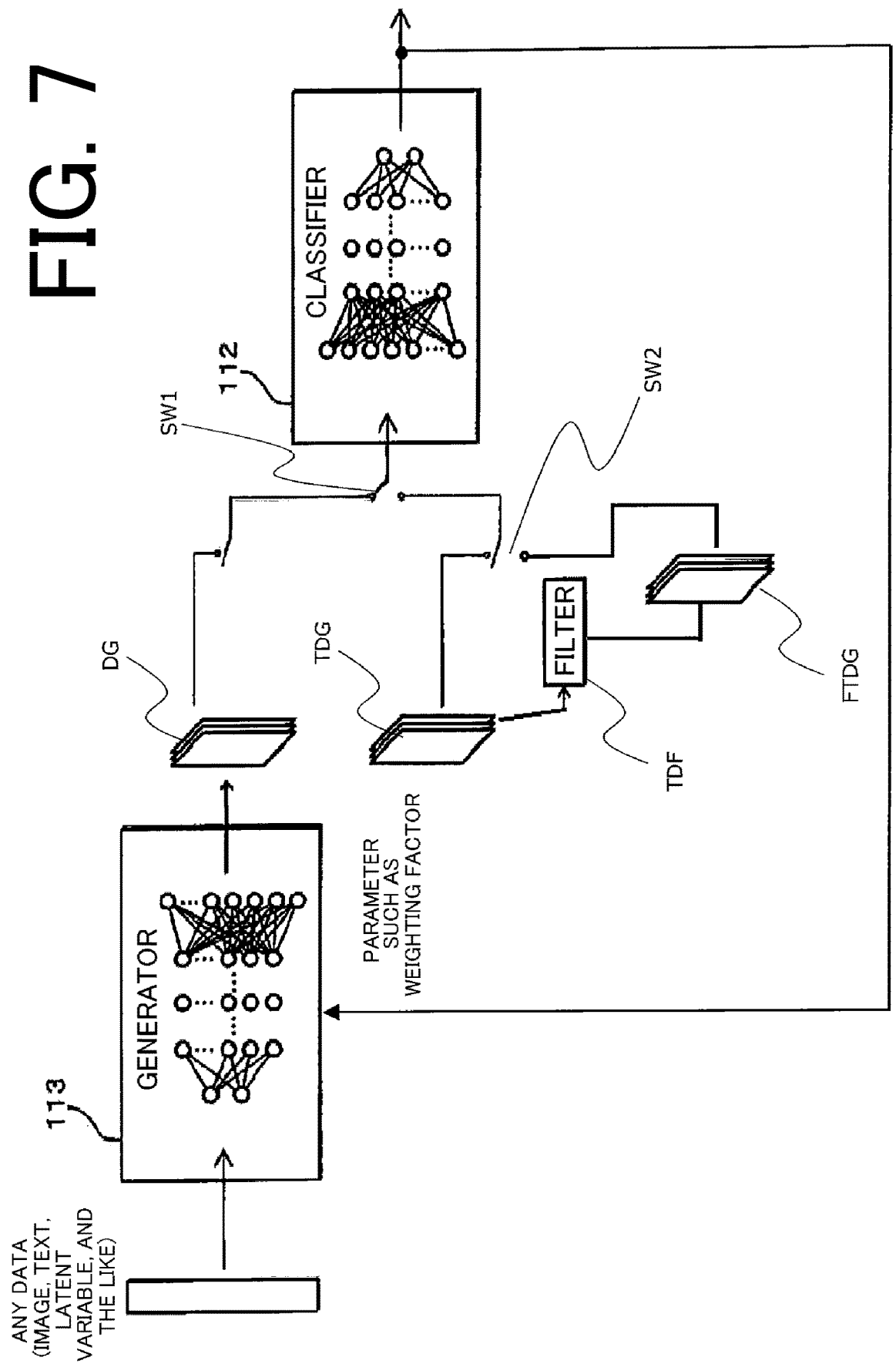

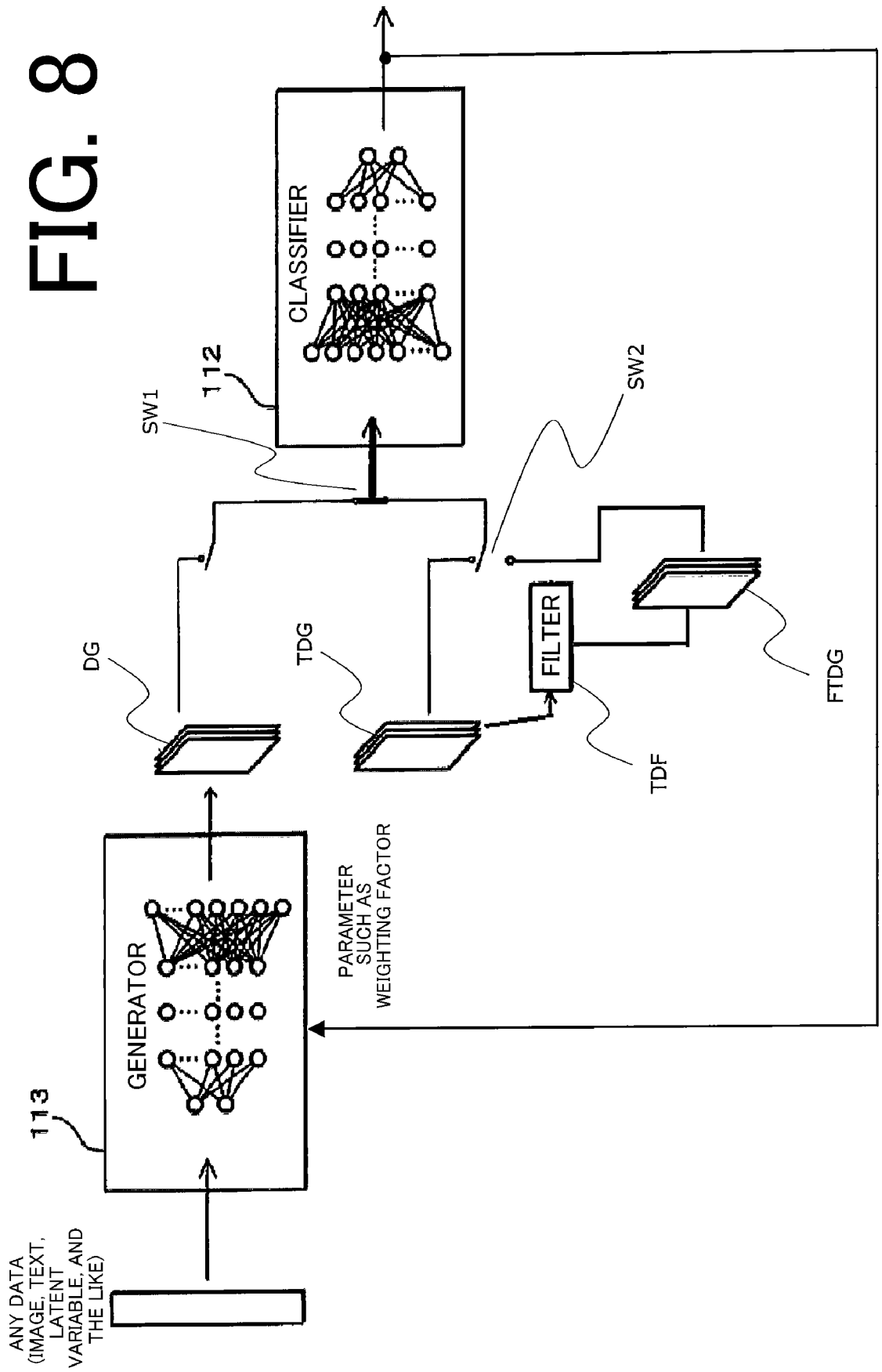

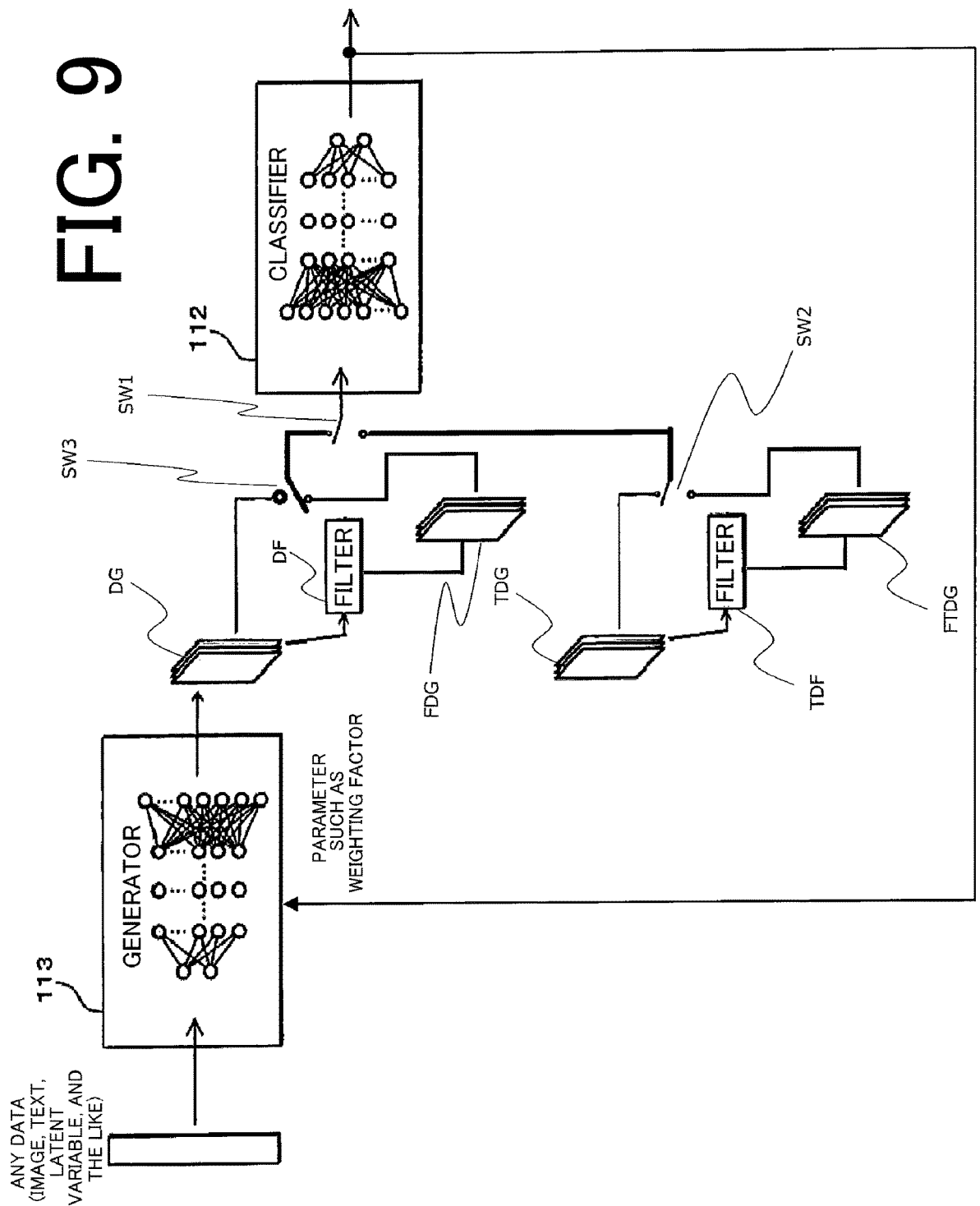

FIG. 13A

ORIGINAL IMAGE BAND DATA 1HH  THRESHOLD ±15

|   | 1 | 2 | 3 | 4 | 5 | 6 | 7 | 8 |
|---|---|---|---|---|---|---|---|---|
| 1 | 15 | 16 | -13 | 2 | 0 | 9 | -21 | 22 |
| 2 | 3 | 22 | -25 | 1 | 9 | -1 | -14 | 22 |
| 3 | -17 | -9 | 48 | -42 | 18 | -16 | 20 | -13 |
| 4 | 20 | -37 | 11 | 36 | -20 | -13 | 20 | -25 |
| 5 | 15 | 36 | -43 | 21 | -24 | 18 | -9 | -14 |
| 6 | -26 | 10 | -10 | -16 | 39 | -16 | -22 | 29 |
| 7 | 13 | -25 | 18 | -27 | 15 | -18 | 34 | -4 |
| 8 | -12 | 7 | -16 | 3 | | | | |

FIG. 13B

NOISE-IMAGE BAND DATA No.1 1HH

|   | 1 | 2 | 3 | 4 | 5 | 6 | 7 | 8 |
|---|---|---|---|---|---|---|---|---|
| 1 | 9 | -12 | 2 | 12 | 9 | -6 | 5 | 4 |
| 2 | -11 | 3 | 9 | -7 | 5 | 4 | 11 | 1 |
| 3 | 6 | -7 | -3 | 5 | 1 | 6 | 1 | -1 |
| 4 | 3 | -7 | -11 | 0 | -13 | -11 | 0 | -8 |
| 5 | -1 | 12 | 10 | 8 | 5 | 13 | 2 | -5 |
| 6 | -1 | 8 | 3 | 6 | -9 | -1 | -12 | -12 |
| 7 | 9 | 0 | 5 | 3 | -10 | 6 | 1 | -7 |
| 8 | 5 | -12 | -13 | 4 | -5 | 0 | 2 | 1 |

FIG. 13C

ORIGINAL IMAGE BAND DATA FOR WHICH CONDITIONAL ADDITION HAS BEEN PERFORMED 1HH

|   | 1 | 2 | 3 | 4 | 5 | 6 | 7 | 8 |
|---|---|---|---|---|---|---|---|---|
| 1 | 24 | 16 | -11 | 15 | 9 | 3 | -21 | 22 |
| 2 | -8 | 22 | -25 | -5 | -14 | 3 | -3 | 22 |
| 3 | -17 | -16 | 48 | -42 | 18 | -16 | 20 | -14 |
| 4 | 20 | -37 | -1 | 36 | -20 | -24 | 20 | -25 |
| 5 | 14 | 36 | -43 | 21 | -24 | 18 | -7 | -19 |
| 6 | -26 | -18 | -12 | -3 | -16 | 16 | -25 | 33 |
| 7 | 21 | -25 | 18 | -27 | 39 | -16 | -22 | 29 |
| 8 | -6 | -5 | -16 | 6 | 10 | -18 | 34 | -3 |

FIG. 14

| 3LL (1/4) | 3HL (1/4) | 2HL (1/2) | 1HL (1) |
| 3LH (1/4) | 3HH (1/4) | | |
| 2LH (1/2) | | 2HH (1/2) | |
| 1LH (1) | | | 1HH (1) |

LEARNING METHOD, COMPUTER PROGRAM, CLASSIFIER, GENERATOR, AND PROCESSING SYSTEM

CROSS-REFERENCE TO RELATED APPLICATIONS

This application is based upon and claims the benefit of priority of the prior Japanese Patent Applications No. 2020-025344, filed on Feb. 18, 2020 and No. 2019-112371, filed on Jun. 17, 2019, the entire contents of which are incorporated herein by reference in their entireties.

FIELD

The present invention relates to a learning method of a machine learning model that processes image data, a computer program, a classifier, a generator, and a processing system.

BACKGROUND

Image recognition, judging, generation methods using a machine learning model, and the like require a huge amount of training data. Therefore, it is known that a recognition performance can be improved by performing data augmentation, such as scaling, rotation, inversion, shift, color conversion, and noise addition, for the same image data in order to increase the number of pieces of the training data, to prepare a huge number of image data pieces that are apparently different from each other and by performing learning that uses the training data obtained by such data augmentation (Japanese Patent Application Laid-open No. 2015-095212).

Further, Japanese Patent Application Laid-open No. 2019-091440 discloses use of a generator and a discriminator (a classifier) for learning a model of generating high-dimensional unstructured data (for example, an image).

Furthermore, "Negative Side Effect of Adversarial Training in Deep Learning and Its Mitigation" discloses that in deep learning using a convolutional neural network, in order to solve the problem that a recognition result is changed when test data called adversarial examples (A. E.) is used, a learner that can oppose the A. E. is constructed by performing learning using data that is training data with random (=unintentional) noise.

CITATION LIST

Patent Literatures

Patent Literature 1: Japanese Patent Application Laid-open No. 2015-095212
Patent Literature 2: Japanese Patent Application Laid-open No. 2019-091440

Non Patent Literature

Non Patent Literature 1: "Negative Side Effect of Adversarial Training in Deep Learning and Its Mitigation/ Yuya Senzaki, Satsuya Ohata, Kanta Matsuura", Proceedings of Computer Security Symposium 2017, p. 385 to p. 392.

Data augmentation is on the assumption that it does not lose any feature of an original image. In data augmentation for a judging device, processing is performed not to have any influence on a judging result (a class), to such a degree that a judging result showing what an object captured in an image is, that is, the appearance that what the object looks like is not changed.

The inventors have further had a finding that omission of learning with regard to elements in image data, which do not any influence visually, may enable the mechanism of human vision to be employed in a model to be learned. Non Patent Literature 1 describes that, regarding comparison between image data that is recognized as a giant panda and mask image data obtained by masking a noise image in that image data, "the image data and the mask image data look almost unchanged to human eyes but are recognized by a CNN as not being a giant panda". However, Non Patent Literature 1 merely describes that the image data and the mask image data are almost unchanged in terms of image data, because the masked noise image is not image based on visual characteristics but is noise having a low signal level.

The present invention is based on this finding and it is an object of the present invention to provide a learning method, a learning model, a classifier, a generator, and a processing system in which human vision is taken into consideration in learning using a machine learning model for an image.

SUMMARY OF THE INVENTION

In a learning method according to a first aspect of the present application, a process of learning a machine learning model that inputs or outputs image data, with data for learning that includes both or either one of image data in which a component that is difficult to visually judge is left out and image data in which a noise component that is difficult to visually judge is added at a predetermined ratio, is caused to be performed.

In a learning method according to a second aspect of the present application, in addition to the learning method according to the first aspect, a process of learning a loss function of a machine learning model that outputs image data from data for learning that includes both or either one of image data obtained by processing a predetermined ratio of the image data output from the machine learning model or image data given to the machine learning model to leave out a component that is difficult to visually judge and image data obtained by processing the predetermined ratio of the image data to add a noise component that is difficult to visually judge, at a predetermined ratio, is caused to be performed.

In a learning method according to a third aspect of the present application, a process of giving data for learning of classifier that includes both or either one of image data in which a component that is difficult to visually judge is left out and image data in which a noise component that is difficult to visually judge is added at a predetermined ratio to a machine learning model that is defined to, when image data is input, output a classification of the input image data, and learning the machine learning model as a classifier, is caused to be performed.

In a learning method according to a fourth aspect of the present application, a process of giving data for learning of generator that includes both or either one of image data in which a component that is difficult to visually judge is left out and image data in which a noise component that is difficult to visually judge is added at a predetermined ratio to a machine learning model for classification that is defined to, when image data is input, output a classification of the input image data, and learning a machine learning model for image generation that is defined to output specific image data when any data is input, as a generator based on an output of the machine learning model for classification, is caused to be performed.

In a learning method according to a fifth aspect of the present application, a process of using a machine learning model for image generation that is defined to, when any data is input, output specific image data and a machine learning model for classification that is defined to, when image data output from the machine learning model for image generation or other image data is input, output a classification of the input image data, using data for learning of classifier and/or data for learning of generator including both or either one of image data in which a component that is difficult to visually judge is left out and image data in which a noise component that is difficult to visually judge is added at a predetermined ratio, and learning the machine learning model for classification and/or the machine learning model for image generation by GAN (Generative Adversarial Networks), is caused to be performed.

In a learning method according to a sixth aspect of the present application, in addition to the learning method according to the fifth aspect, a process is caused to be performed in which a loss function of the machine learning model for classification is calculated by giving data for learning of classifier that is image data obtained by leaving out a component that is difficult to judge visually in a predetermined ratio of both or either one of the image data output from the machine learning model for image generation and the other image data and/or image data obtained by adding a noise component that is difficult to judge visually in the predetermined ratio of the image data, to the machine learning model for classifier, and a loss function of the machine learning model for image generation is calculated by giving data for learning of generator that is the image data output from the machine learning model for image generation to the machine learning model for classification without any change.

In a learning method according to a seventh aspect of the present application, in addition to the learning method according to the fifth aspect, a process is caused to be performed in which a loss function of the machine learning model for a generator is calculated by giving data for learning of generator that is image data obtained by leaving out a component that is difficult to judge visually in a predetermined ratio of both or either one of the image data output from the machine learning model for image generation and the other image data and/or image data obtained by adding a noise component that is difficult to judge visually in the predetermined ratio of the image data, to the machine learning model for classification, and a loss function of the machine learning model for image generation is calculated by giving data for learning of generator that is the image data output from the machine learning model for image generation to the machine learning model for classifier without any change.

In a learning method according to an eighth aspect of the present application, in addition to the learning method according to any one of the first to seventh aspect, both or either one of the image data in which a component that is difficult to judge visually is left out and the image data in which a noise component that is difficult to judge visually is added is generated by preferentially leaving out a component that is more difficult to judge visually or preferentially adding a noise component that is more difficult to judge visually.

A computer program according to a ninth aspect of the present application causes a computer to perform processes of: storing therein definition data of a machine learning model for classification that is defined to, when image data is input, output a classification of an image based on the image data; giving data for learning of classifier that includes both or either one of image data in which a component that is difficult to visually judge is left out and image data in which a noise component that is difficult to visually judge is added at a predetermined ratio, to a machine learning model for classification based on the definition data; and learning the machine learning model for classification as a classifier.

A computer program according to a tenth aspect of the present application causes a computer to perform processes of: storing therein definition data of a machine learning model for image generation that is defined to output specific image data when any data is input, and definition data of a machine learning model for classification that is defined to, when the image data output from the machine learning model for image generation or other image data is input, output a classification of an image based on the input image data; performing both or either one of a process of leaving out a component that is difficult to judge visually and a process of adding a noise component that is difficult to judge visually for a predetermined ratio of the image data output from the machine learning model for image generation or the image data given to the machine learning model for classification; and learning the machine learning model for classification and the machine learning model for image generation by GAN.

A classifier according to an eleventh aspect of the present application comprises: an input unit to which image data is input; an output unit that outputs a classification of an image based on the image data; and a processing execution unit that executes a predetermined process for the image data by using a machine learning model, wherein the classifier is learned with training data including data for learning of classifier that includes both or either one of image data in which a component that is difficult to visually judge is left out and image data in which a noise component that is difficult to visually judge is added at a predetermined ratio, and a classification label of the image data included in the data for learning of classifier, and outputs a classification of input image data to a computer.

A generator according to a twelfth aspect of the present application comprises: an input unit to which any data is input; an output unit that outputs image data of an image generated based on the input data; and a processing execution unit that executes a predetermined process for the input data by using a machine learning model, wherein the generator is learned by using data for learning of generator that includes both or either one of image data obtained by leaving out a component that is difficult to visually judge in a predetermined ratio of the image data output from the output unit or image data given to the machine learning model, and image data obtained by adding a noise component that is difficult to visually judge in the predetermined ratio of the image data, and the generator outputs image data based on any data input thereto to a computer.

A processing system according to a thirteenth aspect of the present application comprises a device that transmits input data to the classifier according to the eleventh aspect or the generator according to the twelfth aspect or receives data output from the classifier or the generator, thereby using the classifier or the generator.

In a processing system according to a fourteenth aspect of the present application, in the processing system according to the thirteenth aspect, the device is a television receiver, a display device, an image-capturing device, or an information processing device including a display unit and a communication unit.

With the learning method, the computer program, the classifier, the generator, and the processing system according to the present invention, it is possible to perform learning in which human vision is taken into consideration and to perform classification or generation that employs the mechanism of vision for image data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 6A and 6B are explanatory diagrams of learning of the classifier;

FIG. 7 is an explanatory diagram of learning of the generator;

FIG. 8 is an explanatory diagram of learning of the generator;

FIG. 9 is an explanatory diagram of learning of the classifier and the generator;

FIGS. 13A to 13C are diagrams illustrating respective data when a conditional addition process is performed;

FIG. 14 is an explanatory diagram of scale adjustment with a quantization width set for each wavelength; and FIGS. 15A, 15B, and 15C are diagrams representing a value of each pixel of noise image data after being subjected to DWT, and a value of each pixel after being subjected to scale adjustment with a quantization width.

DESCRIPTION OF EMBODIMENTS

A learning method, a learning model, a classifier, a generator, a processing system according to the present application are described below with reference to the drawings that illustrate an embodiment. The present embodiment is described by way of example in which processing in the learning method, the learning model, the classifier, the generator, and the processing system is applied to an image processing device that processes images.

<Image Processing Apparatus>

Figure 1:
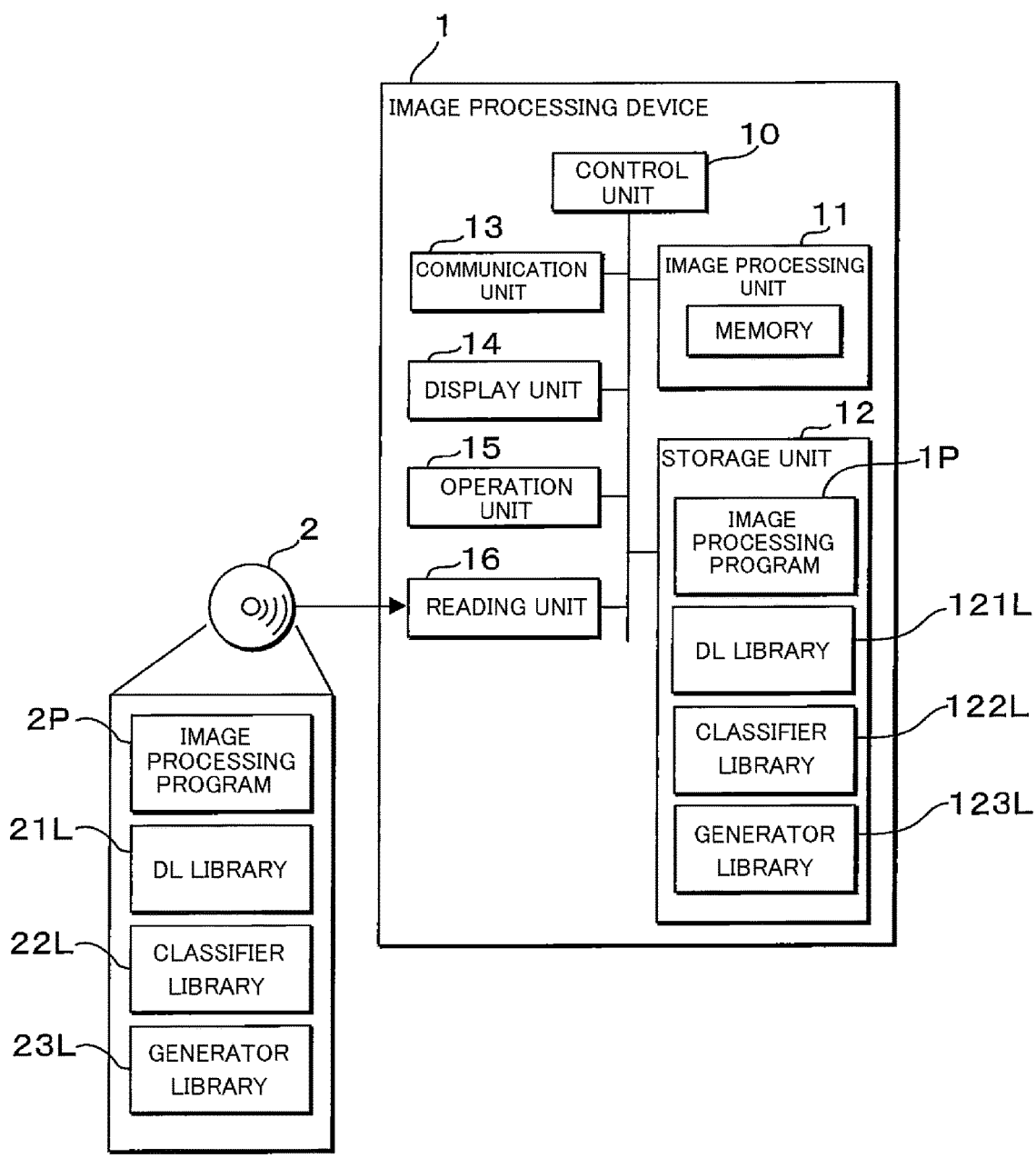
FIG. 1 is a block diagram illustrating a configuration of an image processing device according to the present embodiment.
Figure 2:
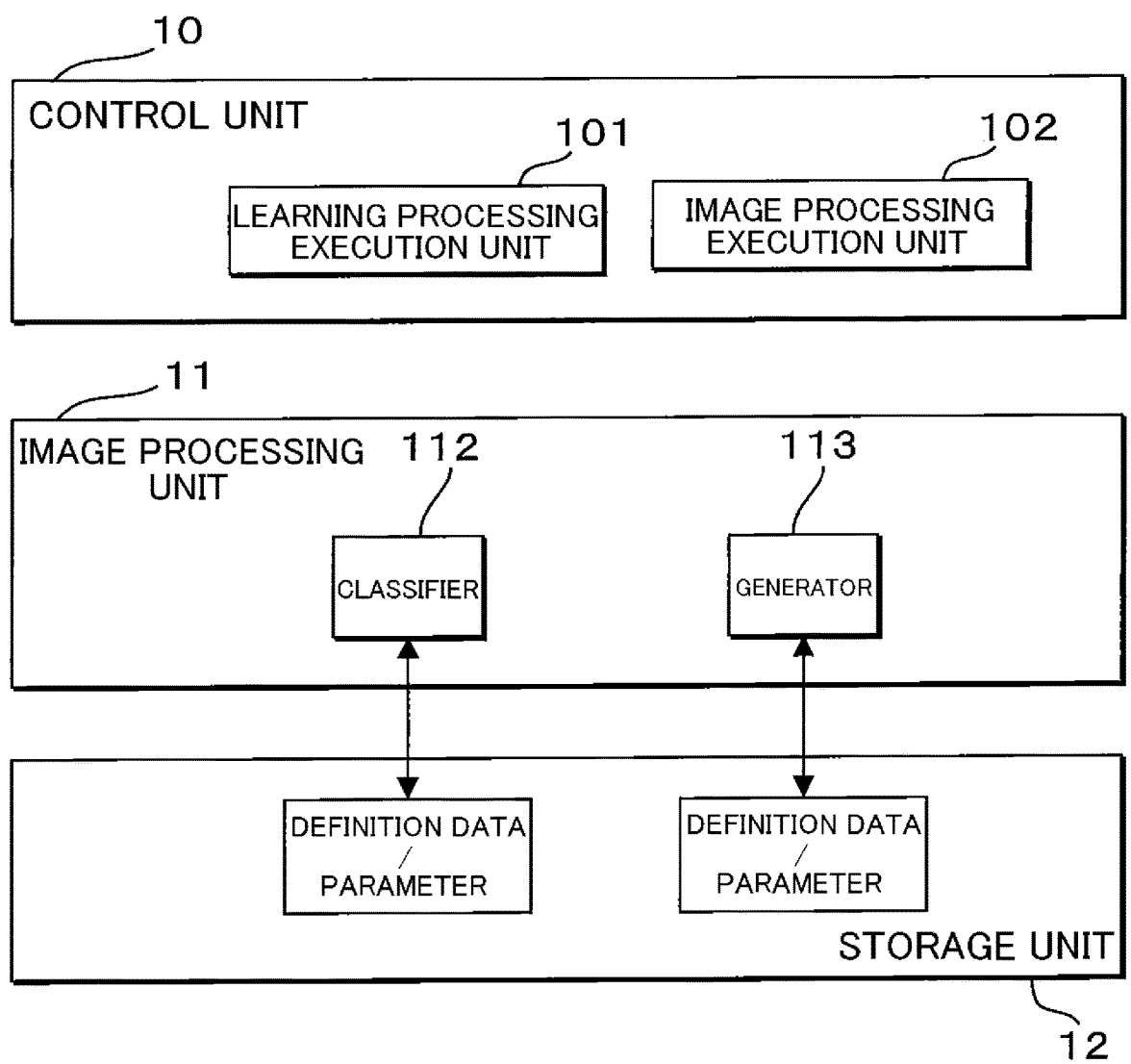
FIG. 2 is a functional block diagram of the image processing device.

FIG. 1 is a block diagram illustrating a configuration of an image processing device 1 according to the present embodiment, and FIG. 2 is a functional block diagram of the image processing device 1. The image processing device 1 includes a control unit 10, an image processing unit 11, a storage unit 12, a communication unit 13, a display unit 14, and an operation unit 15. The image processing device 1 and an operation in the image processing device 1 are described as being implemented by one server computer in the following descriptions. However, a configuration may be employed in which processing is performed by a plurality of computers in a distributed manner.

The control unit 10 uses a processor such as a CPU (Central Processing Unit), and a memory, for example, and controls components of the image processing device 1 to implement various types of functions. The image processing unit 11 uses a processor such as a GPU (Graphics Processing Unit) or a dedicated circuit, and a memory to perform image processing in accordance with a control instruction from the control unit 10. The control unit 10 and the image processing unit 11 may be configured as one unit of hardware. The control unit 10 and the image processing unit 11 may be configured as one unit of hardware into which a processor such as a CPU and a GPU, a memory, and the storage unit 12 and the communication unit 13 are integrated (SoC: System Ona Chip).

The storage unit 12 uses a hard disk or a flash memory. The storage unit 12 stores therein an image processing program 1P, a machine learning library 121L, a classifier library 122L, and a generator library 123L. Further, the storage unit 12 stores therein information that defines a classifier 112 or a generator 113, which is generated for every learning, parameter information in the learned classifier 112 and the learned generator 113, and the like.

The communication unit 13 is a communication module that implements communication connection to a communication network such as the Internet. The communication unit 13 uses a network card, a wireless communication device, or a module for carrier communication.

The display unit 14 uses a liquid crystal panel or an organic EL (Electro Luminescence) display, for example. By the processing in the image processing unit 11 in response to an instruction from the control unit 10, the display unit 14 can display an image.

The operation unit 15 includes a user interface such as a keyboard or a mouse. The operation unit 15 may use physical buttons provided in a case. Also, the operation unit 15 may use software buttons displayed on the display unit 14. The operation unit 15 notifies the control unit 10 of information on an operation by a user.

The reading unit 16 can read an image processing program 2P, a machine learning library 21L, a classifier library 22L, and a generator library 23L that are stored in a storage medium 2 that uses an optical disk or the like by using a disk drive, for example. The image processing program 1P, the machine learning library 121L, the classifier library 122L, and the generator library 123L stored in the storage unit 12 may be duplicates of the image processing program 2P, the machine learning library 21L, the classifier library 22L, and the generator library 23L read from the storage medium 2 by the reading unit 16 and created by the control unit 10 in the storage unit 12.

The control unit 10 of the image processing device 1 functions as a learning processing execution unit 101 and an image processing execution unit 102 based on the image processing program 1P stored in the storage unit 12. Further, the image processing unit 11 functions as the classifier 112 by using the memory based on the machine learning library 121L, definition data, parameter information, and the classifier library 122L that are stored in the storage unit 12. Similarly, the image processing unit 11 functions as the generator 113 by using the memory based on the machine learning library 121L, definition data, parameter information, and the generator library 123L that are stored in the storage unit 12. In FIG. 2, illustration of the machine learning library 121L is omitted in the storage unit 12 because the functions of the classifier 112 and the generator 113 are implemented by the machine learning library 121L.

The function as a machine learning model is provided by the machine learning library 121L. Definition data, such as a layer configuration, and parameters, such as a weight of each node, in the machine learning model are provided by the classifier library 122L and the generator library 123L. Typical examples of the machine learning library 121L are Tensor Flow and Cafe. However, the machine learning library 121L is not limited to such a library, and any machine learning library may be used.

The learning processing execution unit 101 performs a process of learning parameters based on the machine learning library 121L and the classifier library 122L stored in the storage unit 12 and training data provided in a manner described later, to cause a machine learning model to function as the classifier 112. The learning processing execution unit 101 also performs a process of learning parameters based on the machine learning library 121L and the generator library 123L stored in the storage unit 12 and training data provided in a manner described later, to cause a machine learning model to function as the generator 113. These machine learning models may be each configured by a neural network, for example, and may be configured by a convolutional neural network including a convolution layer.

The image processing execution unit 102 uses the learned classifier 112 to perform a process of acquiring a result that is output when image data is given, or uses the learned generator 113 to perform a process of acquiring image data generated by inputting seed data (any data such as data called a latent variable, image data, or text data) to the generator 113. The image processing execution unit 102 may draw the image data output from the generator 113 as an image and output the image to the display unit 14.

The classifier 112 extracts a feature amount from input image data and classifies the input image data based on the extracted feature amount. In the present embodiment, the classifier 112 configures GAN (Generative Adversarial Networks) for learning of the generator 113 as described later, and therefore classifies the input image data into image data generated by the generator 113 (image data derived from the generator 113) and other image data. The generator 113 generates and outputs image data from seed data input thereto. The classifier 112 may be learned to be used alone.

<Classifier and Generator>

Figure 3:
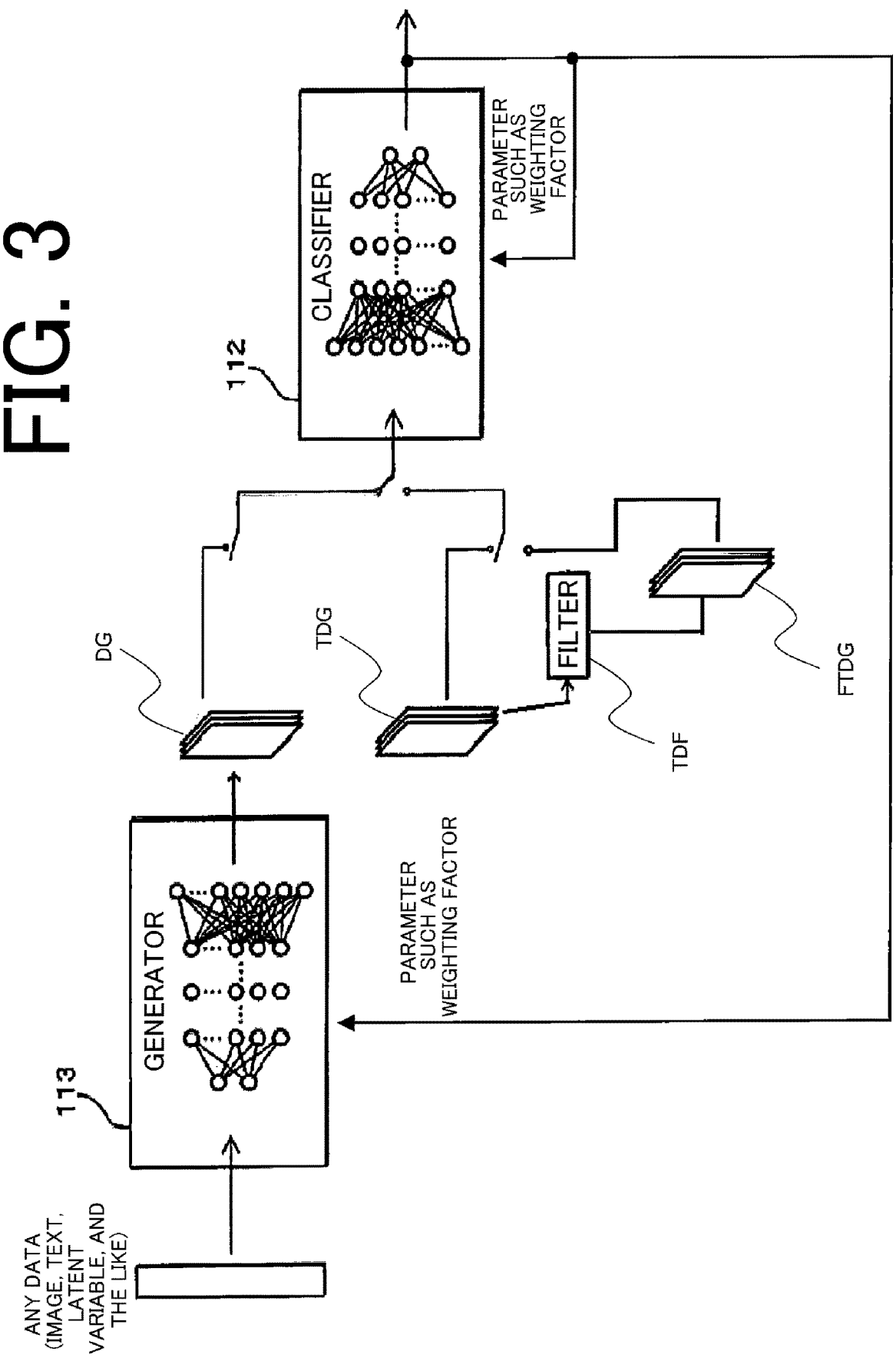
FIG. 3 is an explanatory diagram of the outline of a classifier and a generator.
Figure 4:
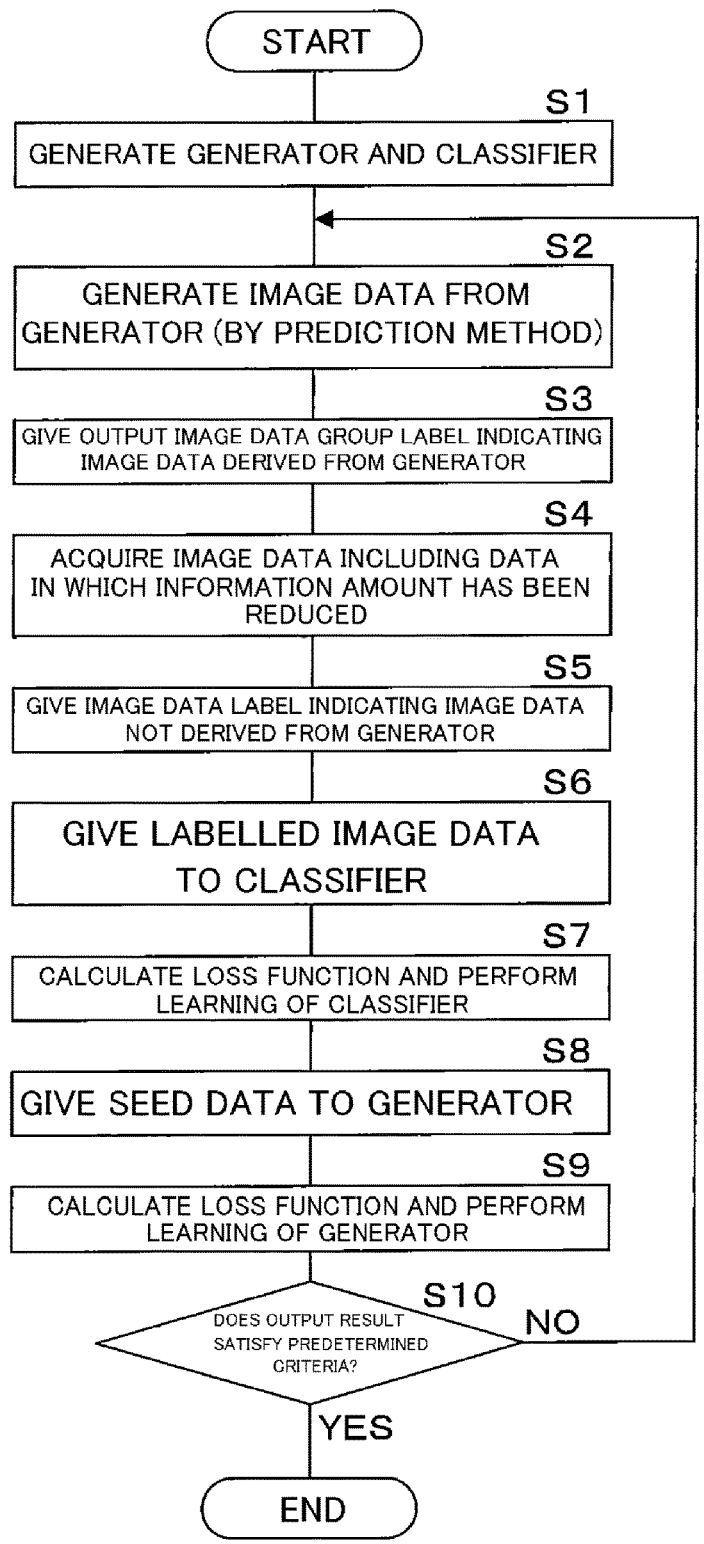
FIG. 4 is a flowchart illustrating an example of a learning processing procedure.

FIG. 3 is an explanatory diagram of the outline of the classifier 112 and the generator 113 in a case of using a neural network as a machine learning model. FIG. 4 is a flowchart illustrating an example of a learning processing procedure. Learning processing by the learning processing execution unit 101 is described referring to FIGS. 3 and 4. The generator 113 is learned by GAN, as illustrated in FIG. 3. Therefore, the classifier 112 and the generator 113 are connected to each other to input an output of the generator 113 to the classifier 112, as illustrated in FIG. 3. Learning by GAN is performed by inputting data generated by the generator 113 and training data to the classifier 112 and then setting parameters of the classifier 112 and the generator 113, such as weighting factors, to minimize a determination error in the classifier 112, for example.

The classifier 112 is configured to include a plurality of stages of convolution layers defined by parameters to be learned. The configuration of the classifier 112 is not limited thereto and may include a pooling layer, a fully connected layer, and the like. The generator 113 outputs image data from any data input thereto, by networks defined by parameters to be learned. The generator 113 is configured by appropriately combining networks such as a transposed convolution layer, a convolution layer, and up-sampling, to output image data.

The control unit 10 generates in advance data defining networks as illustrated in FIG. 3 by the learning processing execution unit 101, based on the machine learning library 121L, the classifier library 122L, and the generator library 123L in the storage unit 12. The control unit 10 generates the generator 113 and the classifier 112 based on definition data generated by a function of the learning processing execution unit 101 (Step S1).

The control unit 10 causes the generator 113 to output an image data group DG as an image data group derived from the generator 113 by a prediction method that predicts an unknown class from seed data (Step S2). The control unit 10 assigns a label indicating image data generated by the generator 113 to the output image data group DG (Step S3).

The control unit 10 acquires, by using image data TDG that is prepared in advance for learning of the classifier 112 as training data for an image data group not derived from the generator 113, changed image data (information reduced data) and unchanged image data based on setting information (Step S4). At Step S4, the control unit 10 may define networks in such a manner that a predetermined ratio of the image data prepared in advance is filtered by a filter in FIG. 3. The image data prepared in advance is a photographic image in which a subject in accordance with the purpose of learning is captured or an image that contains an illustration in accordance with the purpose, for example. The control unit 10 assigns a label indicating image data not derived from the generator 113 to the image data (TDG, FTDG) obtained as training data (Step S5).

<Changed Image Data>

"Changed image data" at Step S4 is acquired by both or either one of a filter that processes an image in such a manner that a component that is difficult to judge visually is left out and a filter that processes an image in such a manner that a noise component that is difficult to judge by human eyes is added. A technique of digital-image compression algorithm is applied as an example of a filter that generates image data for learning of the classifier 112. A filter can be DCT (Discrete Cosine Transform) in JPEG (Joint Photographic Experts Group) or Wavelet transform, for example.

<Leaving Out of Component that is Difficult to Judge Visually>

Use of DCT or Wavelet transform enables limited removal of a component that is difficult to judge by human eyes. For example, in a case of using DCT, it suffices to coarsely quantize high frequency components of a spatial frequency for a result obtained by orthogonal transform of data. In a case of using Wavelet transform, it suffices to cut a component that is small in a high-frequency band in divided bands obtained by orthogonal transform of data. Image data in which a component that is difficult to judge visually has been reduced is obtained by controlling a quantization level after DCT is performed or a band-pass filter after Wavelet transform is performed in this manner and further processing an output of the above transform by using inverse discrete cosine transform or inverse Wavelet transform.

It can be said that use of DCT or Wavelet transform means that image data in which a component that is difficult to judge visually (a high frequency component, a component that is small in a high frequency band) is preferentially left out is obtained. The learning processing execution unit 101 may use a filter other than DCT or Wavelet transform. For example, image data in which an information amount has been reduced may be obtained by converting RGB data to YCC data and performing quantization for each channel. The filtered image data FTDG is obtained by decoding the image data in which a component that is difficult to judge visually has been left out in the above-described manner. The filtered image data FTDG is input to the classifier 112.

"Setting information" at Step S4 is defined as definition data in the storage unit 12 to represent a ratio of changed image data FTDG included in an image data group used for learning or a distribution of the numbers of pieces of the image data with respect to the degree of change. In one example, the degree of change in the changed image data FTDG is a constant level, and the setting information is defined in such a manner that the changed image data FTDG is included in image data to be supplied to the classifier 112 at a predetermined ratio. In another example, all image data for learning is changed image data. Further, an image data group may be used in which a visual weight is given to a channel or a band to increase the importance of a portion that is easy to judge visually.

Figure 5A:
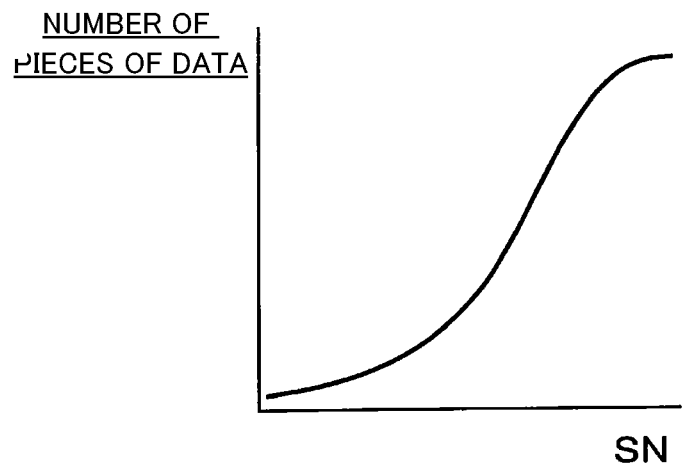
FIGS. 5A to 5C are diagrams illustrating a distribution example of the number of pieces of image data for learning with respect to an SN ratio.
Figure 5B:
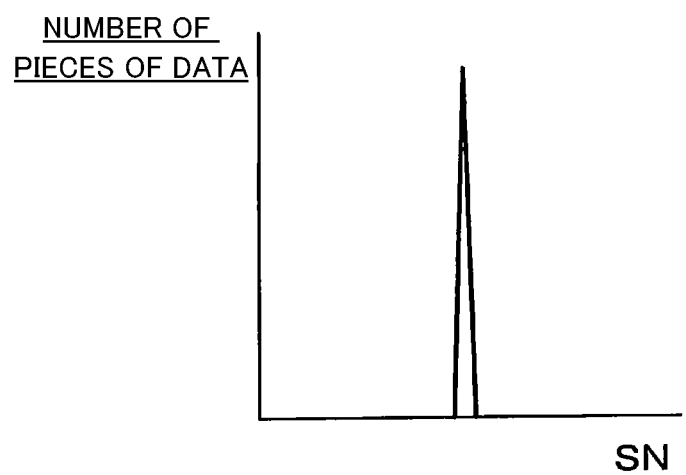
Figure 5C:
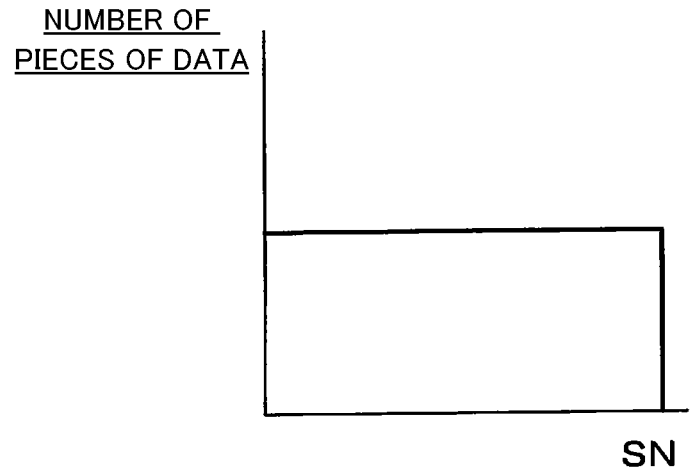

FIGS. 5A to 5C are diagrams illustrating distribution examples of the number of image data (training data) pieces for learning that have been filtered and an SN ratio related to change of image. In FIGS. 5A to 5C, the SN ratio is illustrated as being smaller as the amount of changed information is larger or added noise is more. As illustrated in FIG. 5A, setting information may be defined as a distribution of the number of image data pieces in which image data pieces for which the SN ratio is small, that is, the amount of changed information is large are few and image data pieces for which the amount of changed information is small are many. It suffices that the amount of changed information is adjusted by coarseness of quantization, for example.

Other than data for learning that has a predetermined distribution illustrated in FIG. 5A, learning may be performed by using an image data group in which the amount of changed information is uniform, as illustrated in FIG. 5B. Further, learning may be performed by using data for learning that has a distribution in which the number of pieces of image data is constant irrespective of the amount of changed information, as illustrated in FIG. 5C. Other setting, for example, in which an image data group in which the amount of changed information is uniform is included at 50% and an image data group for which no change has been made is included at 50% can be employed as appropriate.

<Addition of Component that is Difficult to Judge Visually>

Figure 10:
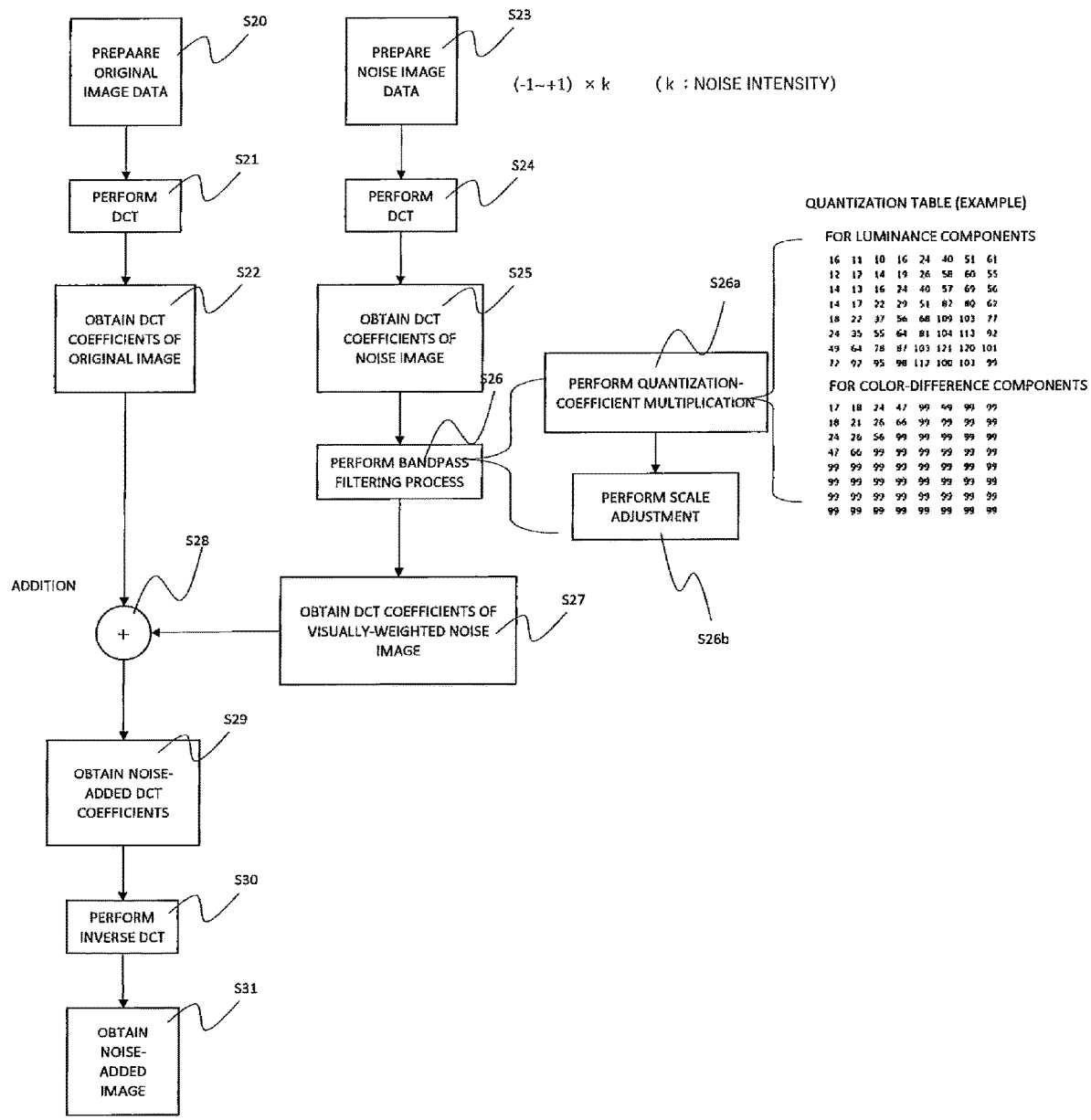
FIG. 10 is an explanatory diagram of processing of adding a noise component that is difficult to judge visually in a case of using DCT.
Figure 11:
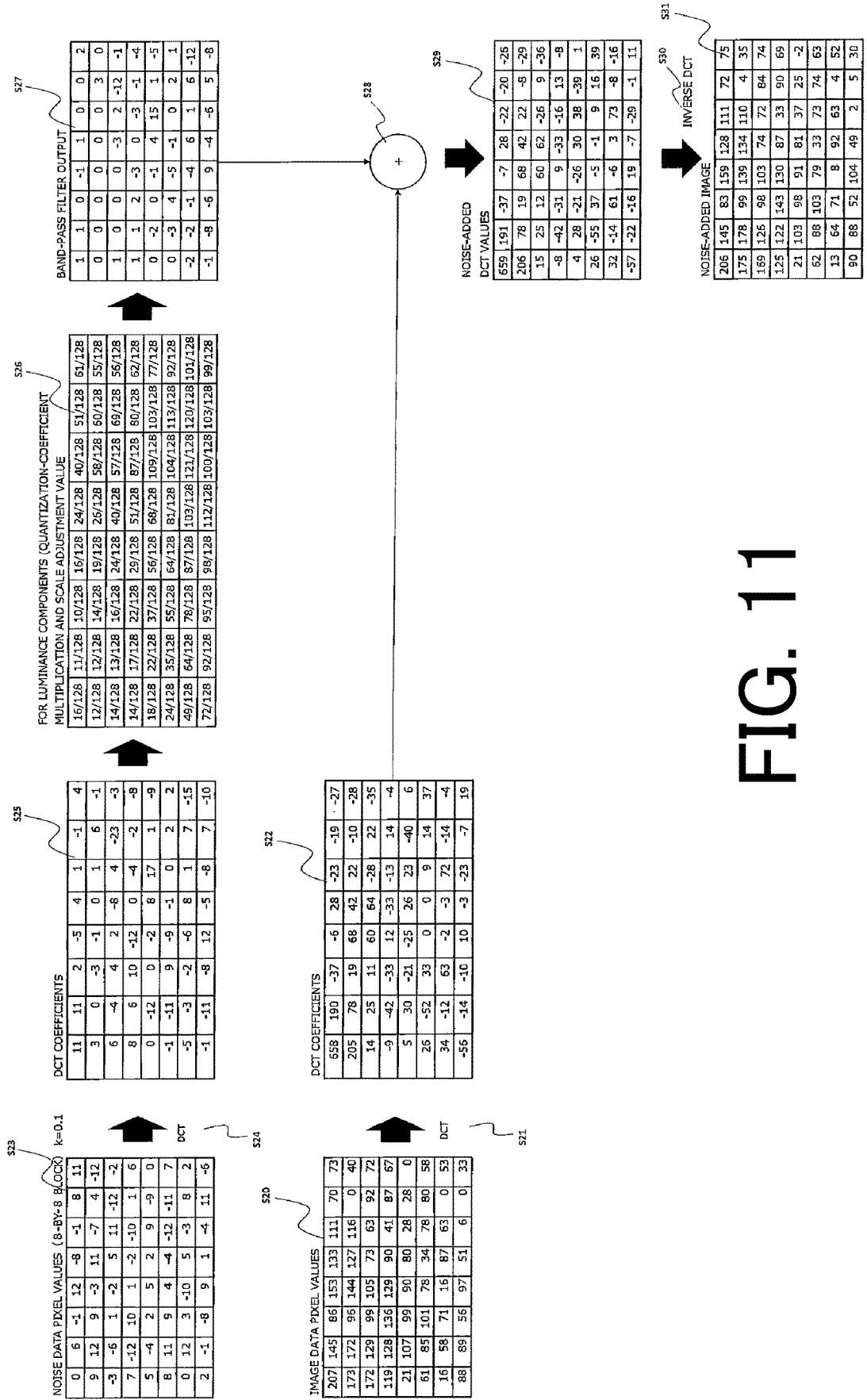
FIG. 11 is a diagram illustrating an example of data including pixel values and DCT values in a case where a noise component that is difficult to judge visually is added to image data.

Next, processing of adding a noise component that is difficult to judge visually is described. FIG. 10 is an explanatory diagram of processing of adding a noise component that is difficult to judge visually in a case of using DCT. FIG. 11 is a diagram illustrating an example of data including pixel values and DCT values in a case where a noise component that is difficult to judge visually is added to image data by using the flow illustrated in FIG. 10. The noise intensity k described later is assumed as 0.1. FIG. 11 describes the number of a corresponding step in FIG. 10 with each data.

First, original image data that is an original of training data is prepared (Step S20), discrete cosine transform is performed (Step S21), and DCT coefficients of an original image are obtained (Step S22). Pixel values of the original image are in the range from 0 to 1, and are in the range from 0 to 255 when being represented in 8 bits.

Whereas the aforementioned processing of leaving out a component that is difficult to judge by human eyes uses image data for which inverse DCT is performed by using DCT coefficients of low-frequency components among the DCT coefficients of the original image, for machine learning, the present embodiment uses all the DCT coefficients. DCT coefficients for which portions are left out may be used, in place of all the coefficients.

Meanwhile, noise image data having the same size as the original image data that has been subjected to DCT is prepared (Step S23). Any noise image, for example, Gaussian noise, Perlin noise, or uniformly distributed noise can be used as a noise image used here. The dynamic range of each pixel of the noise image is in the range from −1 to +1 and has the center at 0, and the noise intensity k can be adjusted to any value. Discrete cosine transform is performed for such noise image data (Step S24), so that DCT coefficients of the noise image are obtained (Step S25).

Thereafter, the DCT coefficients of the noise image are subjected to a band-pass filtering process (Step S26). The band-pass filtering process is performed by a quantization-coefficient multiplication process (Step S26*a*) and scale adjustment (Step S26*b*). In more detail, the quantization-coefficient multiplication process is performed by using the same table as a quantization table used in conversion of image data to a JPEG format, for example, and by multiplying the DCT coefficients of the noise image obtained at Step S25 by respective quantization coefficients. The scale adjustment at Step S26*b* is performed by dividing respective coefficients by a value around the maximum value of the coefficients used in the multiplication process, for example. That is, regarding luminance components, division by 128, for example, is performed because the maximum value in a quantization table for luminance components is 121. Also for color-difference components, the same divisor as that used for the luminance components is used. By multiplication by values in the quantization table and dividing the result of multiplication by a value around the maximum value of respective coefficients, noise that is in proportion to rounding (making a value fall within a certain range) in quantization is added, so that DCT coefficients of a noise image having many components that are difficult to judge visually can be obtained (Step S27).

Next, the DCT coefficients of the original image obtained at Step S22 and the DCT coefficients of the visually-weighted noise image obtained at Step S27 are added to each other (Step S28) to obtain noise-added DCT coefficients (Step S29), and inverse DCT is further performed (Step S30) to obtain a noise-added image (Step S31).

By supplying the noise-added image generated in this way to the generator 113 or the classifier 112 as training data, it is possible to perform machine learning with regard to an image to which many noise components that are difficult to judge visually are added. Although a component that is difficult to judge visually is added by using DCT in the above description, modified discrete cosine transform (MDCT) may be used to perform noise addition by overlapping blocks each other because there is a possibility of generation of a noise block in a case of DCT. Further, in the IDCT, clipping of a pixel value has to be performed in a range from 0 to 255. Therefore, even in a case where a value handled by a frequency component, for example, a value of each pixel in the addition process (Step S28) exceeds a predetermined upper limit, the value may be used as it is without performing clipping.

Figure 12:
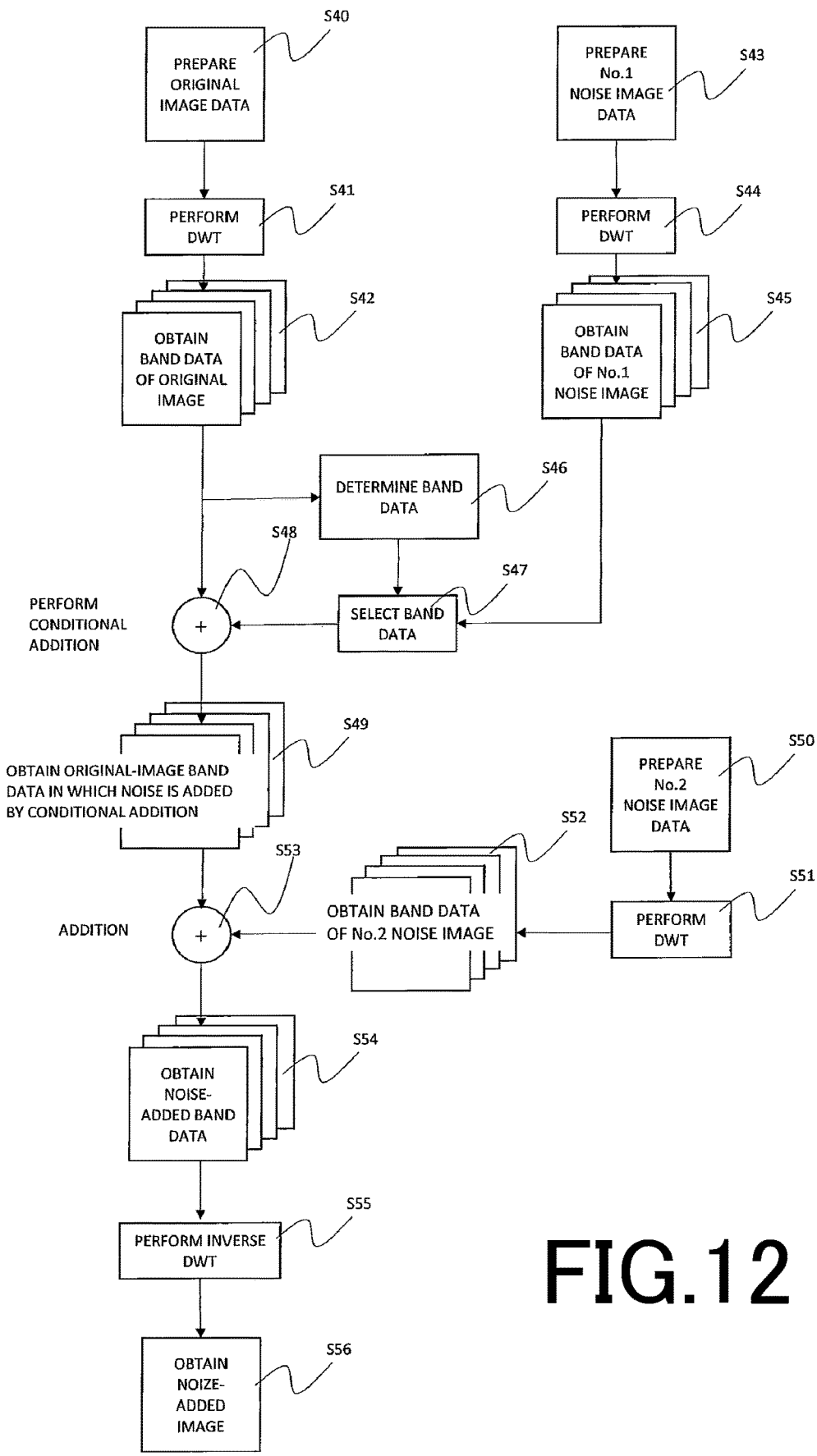
FIG. 12 is an explanatory diagram of processing of adding a noise component that is difficult to judge visually in a case of using DWT.

Next, processing of adding a noise component that is difficult to judge visually in a case of using DWT is described referring to FIGS. 12 to 15. FIG. 12 is an explanatory diagram of the processing of adding a noise component that is difficult to judge visually in a case of using DWT.

First, original image data that is an original of training data is prepared (Step S40), and discrete wavelet transform (DWT) is performed (Step S41), so that band data of an original image is obtained (Step S42). Pixel values of the original image are in the range from 0 to 1, and are in the range from 0 to 255 when being represented in 8 bits. The band data of the original image after DWT is broken down into sub-bands of low-frequency components, high-frequency components in a horizontal direction, high-frequency components in a vertical direction, and high-frequency components in the horizontal and vertical directions (a plurality of pieces of the band data of the original data illustrated at Step S42 represent the sub-bands).

Meanwhile, a No. 1 noise image data having the same size as the original image data that has been subjected to DWT is prepared (Step S43). Any noise image, for example, Gaussian noise, Perlin noise, or uniformly distributed noise can be used as a noise image used here. The dynamic range of each pixel of the noise image is in the range from −1 to +1 and has the center at 0, and the noise intensity k can be adjusted to any value. Discrete wavelet transform is performed for such noise image data (Step S44), so that band data of the No. 1 noise image is obtained (Step S45).

Thereafter, a conditional addition process is performed by using the band data of the original image and the band data of the No. 1 noise image. The conditional addition process determines, with regard to the band data of the original image, whether there is a band data piece equal to or less than a threshold set for each bandwidth (Step S46), selects a piece of the band data of the No. 1 noise image at a position corresponding to the band data piece of the original data that is equal to or less than the threshold (Step S47), and adds the selected No. 1 noise-image band data piece to the original-image band data piece that is equal to or less than the threshold to each other (Step S48).

FIGS. 13A to 13C illustrate data when a conditional addition process is performed. The data is represented as an 8-by-8 block for convenience of description. FIG. 13A represents values of band data 1HH (high-frequency band) obtained by performing DWT for an original image, FIG. 13B represents values of band data 1HH (high-frequency band) obtained by performing DWT for a noise image for which the noise intensity k is assumed to 0.1, and FIG. 13C represents original-image band data after conditional addition.

When thresholds for the original-image band data when conditional addition is performed are set to, for example, ±15, it is found that absolute values of values at hatched positions in FIG. 13A are equal to or smaller than the absolute value of the thresholds. This determination whether an absolute value of a piece of the band data of the original image is equal to or smaller than the absolute value of the thresholds is performed at Step S46, and a piece of band data of the No. 1 noise image at a position corresponding to the piece of the band data of the original image having the absolute value determined as being equal to or smaller than the absolute value of the thresholds is selected at Step S47 as illustrated in FIG. 13B. Thereafter, a value of the selected piece of the band data of the No. 1 noise image is added to a value of the piece of the band data of the original image at Step S48, so that original-image band data in which noise is added by conditional addition is obtained as illustrated in FIG. 13C. As one example, a value of the band data of the original image at x3·y1 is −13, the absolute value of which is equal to or smaller than the absolute value of the thresholds, and a value of the band data of the No. 1 noise image at the same position is 2. Therefore, the result of addition of those values is −11. Similarly, a value of the band data of the original image at x2·y3 is −9 and a value of the band data of the No. 1 noise image at the same position is −7. Therefore, −16 is stored. The same process is performed for every piece of band data, so that original-image band data in which noise is added by conditional addition is obtained (Step S49). This conditional addition process is not performed for LL in the last step of DWT. For example, in a case of level-2 bandwidth division, the conditional addition process is performed for band data except for 2LL. Further, a threshold in conditional addition is set to be larger in a higher-frequency band. Accordingly, with regard to band data that has no visual influence, the tendency that band data of a noise image is added becomes stronger. That is, it is preferable that a threshold for each band data is set in such a manner that a threshold for 1HL, 1LH<a threshold for 1HH. Further, it suffices that the threshold and the noise intensity k are adjusted as appropriate to obtain data having no visual influence. Furthermore, in a case where a value of a piece of band data of noise-added image data exceeds a predetermined threshold, it suffices that clipping with that threshold is performed.

Next, No. 2 noise image data that is different from the image data used at Step S43 is prepared (Step S50). Any noise image, for example, Gaussian noise can be used as a No. 2 noise image used here, as with the No. 1 noise image described above. The dynamic range of each pixel of the noise image is in the range from −1 to +1 and has the center at 0, and the noise intensity k can be adjusted to any value.

Discrete wavelet transform is performed for the No. 2 noise image data (Step S51), so that band data of the No. 2 noise image is obtained (Step S52). For the result of DWT for the No. 2 noise image data, scale adjustment is performed in a range of quantization width set for each bandwidth.

FIG. 14 is an explanatory diagram of scale adjustment with a quantization width set for each wavelength. In a case where level-3 sub-bands are generated by DWT, quantization widths at respective levels have a double relation therebetween, for example. Therefore, assuming that the unit of quantization width at level 1 is 1, the unit of quantization width at level 2 is ½, and the unit of quantization width at level 3 is ¼.

Figures 15A, 15B, 15C:
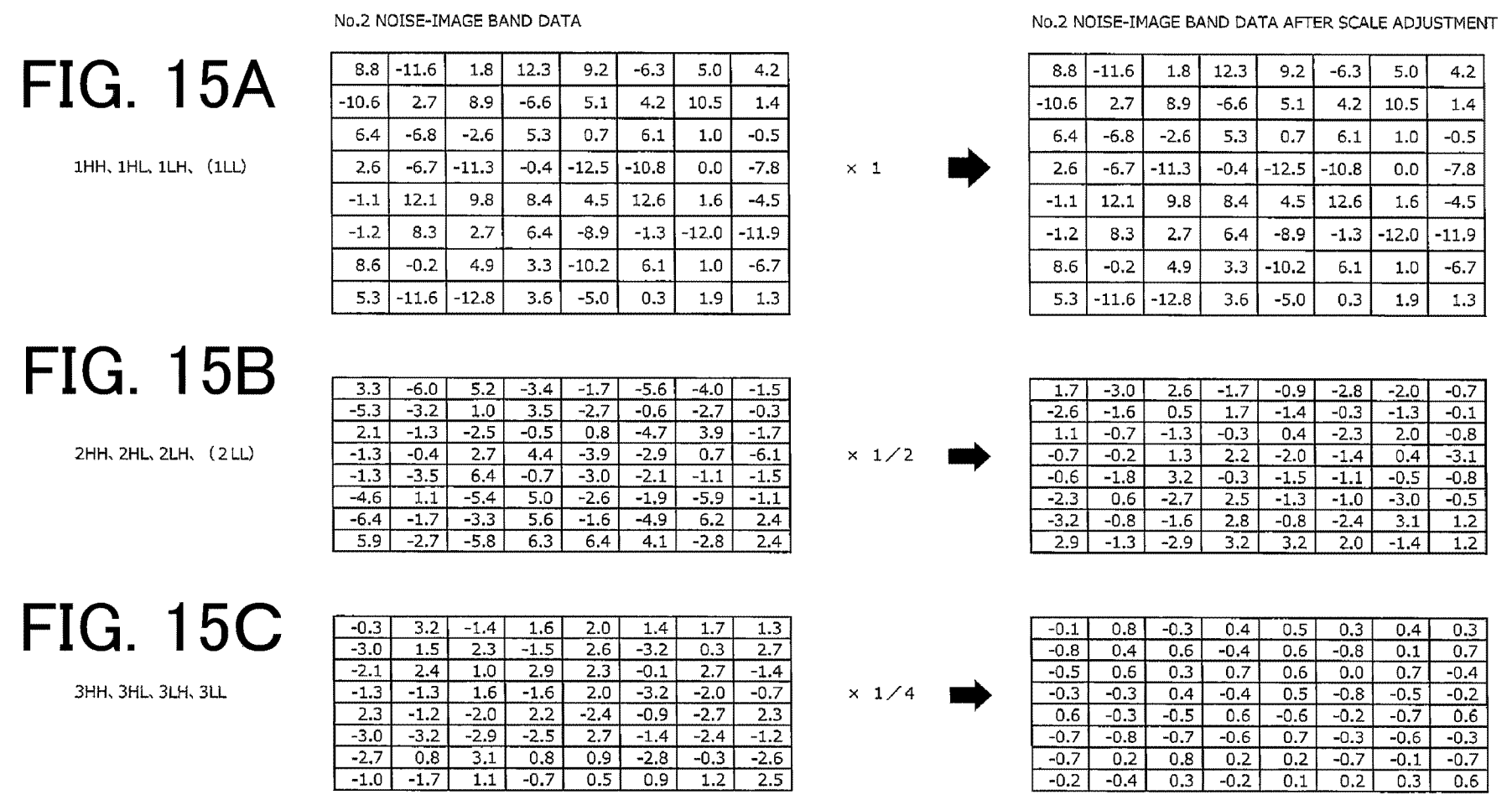

FIGS. 15A, 15B, and 15C represent a value of each pixel of noise image data for which the noise intensity k is set to about 0.1 after DWT and a value of each pixel after scale adjustment with a quantization width. FIG. 15A represents 1HH, 1HL, and 1LH band data and band data after scale adjustment, FIG. 15B represents 2HH, 2HL, and 2LH band data and band data after scale adjustment, and FIG. 15C represents 3HH, 3HL, 3LH, and 3LL band data and band data after scale adjustment. Although the level-3 case is illustrated, level-1 or level-2 bandwidth division or level-4 or more bandwidth division may be performed.

As illustrated in FIGS. 15A to 15C, when noise image data is subjected to DWT, a pixel value becomes larger toward a high-frequency side and becomes smaller toward a low-frequency side. Further, by scale adjustment with the quantization width, an absolute value of a piece of band data becomes larger toward the high-frequency side and becomes smaller toward the low-frequency side.

The band data of the No. 2 noise image after being subjected to scale adjustment is added to the band data the original image in which noise is added by conditional addition (Step S53), so that noise-added band data is obtained (Step S54). The noise-added band data is subjected to inverse DWT (Step S55), so that a noise-added image is obtained (Step S56). When the band data of the No. 2 noise image after being subjected to scale adjustment is added to the band data of the original image in which noise is added by conditional addition, a pixel value of noise image data, in particular, in a high-frequency band may exceed a reference value. This is because there is a tendency that a pixel value of noise image data in a high-frequency band is larger than a pixel value of the noise image data in a low-frequency band, and because the pixel value in the high-frequency band is hard to compress by scale adjustment. Therefore, in a case where a pixel value obtained by addition exceeds the reference value, it suffices that data at that position is clipped at the maximum value. For example, in a case where data is represented by 0 to 255, it is possible to perform clipping at the maximum value 255 by setting the reference value to "255".

By supplying the noise-added image generated in this way to the generator 113 or the classifier 112 as training data, it is possible to perform machine learning with regard to an image to which many noise components that are difficult to judge visually are added. Although No. 2 noise image data is subjected to DWT to obtain band data of the No. 2 noise image and the band data of the No. 2 noise image is added to band data of an original image in which noise is added by conditional addition at Step S53 in the above embodiment, an equivalent result to that of the aforementioned embodiment can be also obtained by performing inverse discrete wavelet transform for the band data of the No. 2 noise image (S52) to obtain image data, also performing inverse discrete wavelet transform for the original-image band data in which noise is added by conditional addition to obtain other image data, and adding pixel values in both the image data to obtain a noise-added image. Further, in IDWT, clipping of a pixel value has to be performed in a range from 0 to 255. Therefore, for data handled by frequency components, for example, in the conditional addition process (Step S48), the addition process (Step S53), and the like, a data value may be used as it is without performing clipping.

Referring back to FIGS. 3 and 4, the description is continued.

<Learning of Classifier>

The control unit 10 gives a labelled image data group (learning data for classifier) obtained by Steps S3 and S5 to the classifier 112 (Step S6), and calculates a loss function of the classifier 112 and performs learning (Step S7), by a function of the learning process execution unit 101. Accordingly, regarding image data that is prepared in advance, as described above, the classifier 112 is learned by using an image data group for learning that includes changed image data at a predetermined ratio.

As illustrated in FIG. 6A, in learning of the classifier 112, a plurality of pieces of image data DG generated while parameters in the generator 113 are fixed are input to the classifier 112, and parameters in the classifier 112 are set in such a manner that the classifier 112 provides "false determination", that is, determines that the input image data is image data derived from a generator. Further, as illustrated in FIG. 6B, a switch SW1 is switched to input the training data TDG to the classifier 112, and the parameters in the classifier 112 are set to provide "true determination".

When the classifier 112 is learned by using training data, the image data TDG and the image data FTDG in which a component that is difficult to judge visually has been changed by the filter TDF as training data are input to the classifier 112 by switching a switch SW2. As a mixing ratio of the image data TDG and FTDG as training data, it suffices that a ratio illustrated in any of FIGS. 5A to 5C is used, for example. Although each switch SW is illustrated for convenience of the description, the function of each switch is implemented by switching input data by the control unit 10. Further, an image data group (DG, TDG, FTDG, and FDG) used for learning of the classifier 112 functions as data for learning of classifier. Furthermore, image data FDG, which is obtained by filtering the image data DG that is output from the generator 113 and in which the information amount is changed, may be used as illustrated in FIG. 9 that will be referred to later, although illustration is omitted in FIGS. 6A and 6B.

<Leaning of Generator>

Subsequently, the control unit 10 gives seed data to the generator 113 in networks that include the classifier 112 after being subjected to Step S7, by a function of the learning processing execution unit 101 (Step S8).

The control unit 10 inputs an image data group output from the generator 113 by Step S8 to the classifier 112, and calculates a loss function in the generator 113 based on a determination result of the classifier 112 and performs learning (Step S9). At this time, the control unit 10 fixes weighting factors in the classifier 112, and updates parameters in the generator 113 from an output of the classifier 112 that is a result of true-false determination.

FIG. 7 is an explanatory diagram of learning of the generator 113. In learning of the generator 113, any seed data is given to the generator 113, a plurality of pieces of image data DG generated by the generator 113 are supplied to the classifier 112, and parameters in the generator 113 are set in such a manner that the classifier 112 provides "true determination".

Regarding a loss function in learning of the generator 113, a parameter set may be used as parameters in the classifier 112, which is a result of learning of the classifier 112 by only using image data in which the information amount has not been changed as training data. Alternatively, a parameter set may be used which is a result of learning of the classifier 112 by using image data in which the information amount has not been changed and image data in which the information amount has been changed. Further, a parameter set may be used which is a result of learning of the classifier 112 by only using image data in which the information amount has been changed. In any case, by performing learning of the generator 113 while the parameters in the classifier 112 are fixed, the parameters in the generator 113 can be more easily converged. In learning of the generator 113, data in which the information amount has not been changed is the image data DG and the training data TDG, and data in which the information amount has been changed is the image data FTDG obtained by filtering the training data TDG with the filter TDF. This image data group (DG, TDG, FTDG, and FDG) used for learning of the generator 113 functions as data for learning of generator.

<Specific Example of Learning of Classifier and Generator>

In learning of the generator 113, it is necessary to set training data in accordance with which data is input and which data is obtained. For example, in a case where photographic data is input as seed data to the generator 113 and cartoon data is generated in the generator 113 from the input photographic data, data that has a feature of "photograph" and data that has a feature of "cartoon" may be used as training data.

Here, it is necessary to compare an output of the generator 113 with the cartoon data in the training data in order to bring the output of the generator 113 close to the cartoon data. However, these data cannot be directly compared with each other by using a mean squared error or the like. Therefore, the image data group generated by the generator 113 is labeled to represent an image derived from the generator 113, the cartoon data in the training data is labeled to represent cartoon data (being true), for example, and the classifier is learned.

Parameters in a loss function of the generator 113 may be set in such a manner that, regarding the classifier 112 learned in this manner, the classifier 112 outputs "true determination" with regard to data obtained by inputting photographic data in the training data to the generator 113.

Meanwhile, in a case where training data pieces that form a pair are obtained as the input and the output of the generator 113, for example, in a case where the input is photographic data and the output is also photographic data and a case where the input is cartoon data and the output is also cartoon data, learning can be performed by directly comparing the output of the generator 113 and the training data with each other.

More specifically, in a case of performing a process of improving the resolution of image data in the generator 113, it is possible to perform learning of the generator 113 by preparing a high-resolution image as training data in advance, inputting image data obtained by lowering the resolution of the high-resolution image to the generator 113 as seed data, and using generated high-resolution image data that is output from the generator 113 and original high-resolution data.

In this case, it suffices to update parameters in the generator 113 with a difference between a value obtained when the output of the generator 113 is input to the classifier 112 and a value obtained when the output-side training data is input to the classifier 112. Further, as illustrated in FIG. 8, the generator 113 may be learned based on a result obtained by switching the switch SW1 and inputting a difference obtained by direct comparison between original image data that serves as training data and image data output from the generator 113 to the classifier 112.

Also in these cases, it is possible to use not only the original high-resolution training data but also training data in which the information amount has been reduced by the filter TDF. The number of pieces of the training data in which the information amount has been reduced and the degree of reduction of the information amount in each piece of the training data can be set in any manner.

Further, as illustrated in FIG. 9, when learning of the classifier 112 or the generator 113 is performed, learning may be performed by inputting the image data FDG to the classifier 112, where the image data FDG is input by inputting the image data DG generated by the generator 113 to the filter DF and switching a switch SW3, and is data in which the information amount of a component that is difficult to visually judge has been reduced from the generated image data.

As described before, learning of the generator 113 is not performed during learning of the classifier 112, and learning of the generator 113 is performed while parameters in the classifier 112 such as weights are fixed. In this case, loss functions defined by the classifier 112 and the generator 113 can be easily converged. However, definition data may be generated to cause learning of the classifier 112 and learning of the generator 113 to be performed simultaneously, and learning of them may be performed.

The control unit 10 determines whether the output result of the classifier 112 satisfies predetermined criteria by a function of the learning processing execution unit 101 (Step S10). When it is determined that the output result of the classifier 112 does not satisfy the predetermined criteria (S10: NO), the control unit 10 returns the process to Step S2 and repeats the processes in Steps S2 to S9.

When it is determined that the output result of the classifier 112 satisfies the predetermined criteria in Step S10 (S10: YES), the learning process is ended. "Predetermined criteria" in Step S10 are, for example, whether the accuracy of the classifier 112 is decreased to half, that is, the classifier 112 cannot classify image data as image data derived from the generator 113 accurately. In another example, "predetermined criteria" are whether learning is performed a predetermined number of times or more. Other criteria may be used in order to determine whether learning has proceeded sufficiently.

Data in which a component that is difficult to visually judge has been changed may be used in the following manner. A loss function in GAN includes a component of the classifier 112 and a component of the generator 113. In learning of the classifier 112 at Step S7 in the flowchart in FIG. 4, the component of the generator 113 is fixed and the component of the classifier 112 is optimized (maximized). In learning of the generator 113 at Step S9, the component of the classifier 112 is fixed and only the component of the generator 113 is used.

In this case, in calculation of a loss function in learning of the classifier 112 at Step S7, the control unit 10 that functions as the learning process execution unit 101 may acquire image data that is prepared in advance for learning without reducing the information amount in place of Step S4, instead change a predetermined ratio of image data output from the generator 113 acquired at Step S3, and give both the image data to the classifier 112.

In this case, calculation of a loss function in learning of the generator 113 at Step S9 is performed without changing the image data output from the generator 113 (without filtering between the generator 113 and the classifier 112 in FIG. 3).

Further, in calculation of a loss function in learning of the classifier 112 at Step S7, the control unit 10 that functions as the learning process execution unit 101 may uniformly change image data that is prepared in advance at Step S4, also change a predetermined ratio of image data output from the generator 113 acquired at Step S3, and give both the image data to the classifier 112.

Meanwhile, in learning of the generator 113, the control unit 10 that functions as the learning processing execution unit 101 may perform calculation of a loss function in learning of the classifier 113 at Step S9 by changing a predetermined ratio of output image data.

In this case, calculation of a loss function in learning of the classifier 112 at Step S7 is performed without changing information in both or either one of the image data that is prepared in advance and the image data output from the generator 113.

By performing learning that uses image data in which data has been changed in this manner, image data generated by the generator 113 can be data having sufficient quality in appearance even if data is deteriorated. That is, by omitting learning with regard to elements that do not have any influence visually, it is possible to employ the mechanism of human vision into a machine learning model to be learned.

As processing of omitting elements that do not have any influence visually, it is preferred that proven processing is performed which reduces data to such an extent that deterioration is not visually recognized, for example, DCT, as described in the present embodiment.

In the present embodiment, the classifier 112 is used for learning of the generator 113, and is learned as classifying images into an image generated by the generator 113 and an original image. Accordingly, the image processing execution unit 102 can generate image data that is comparable in appearance although information that does not have any influence visually is omitted and an SN ratio is low, by using the learned generator 113 and given seed data.

The classifier 112 is not limited thereto, and may be learned to be used alone. In this case, both or either one of image data in which a component that is difficult to judge visually has been left out and image data in which a noise component that is difficult to judge visually is added is used as at least a portion of data for learning selected in accordance with the purpose of use of the classifier 112. In addition, by omitting learning with regard to elements that do not have any influence visually in learning related to image data in a machine learning model, it is possible to employ the mechanism of human vision in the machine learning model to be learned. The image processing execution unit 102 can determine whether an image conforms to the purpose of classification by using the learned classifier 112, irrespective of whether that image is image data in which the information amount has been changed.

Further, various services can be provided in a processing system that uses data obtained from the classifier 112 or the generator 113 that has been already learned. A device that provides a service by using the data is a television receiver that receives and displays television broadcasting, a display device that displays an image, an image-capturing device that is a camera, and the like. Further, such a device may be an information processing device that includes a display unit and a communication unit and can transmit/receive information to/from the classifier 112 or the generator 113, for example, a so-called smartphone, a game console, and an audio device.

In the above embodiment, an example has been described in which GAN are configured as a machine learning model and image data is generated and classified. However, the machine learning model is not limited thereto. For example, in a machine learning model using audio data, an application is possible such as learning by using data in which information that is difficult to judge by human hearing has been reduced.

It should be understood that the embodiment described above is only an example in all respects and is not a limitation to the present invention. It is intended that the scope of the present invention is not defined by the meaning described above but by the scope of claims and includes all variations in the meaning and the scope which are equivalent to the scope of claims.

REFERENCE SIGNS LIST

1 image processing device
10 control unit
101 learning processing execution unit
102 image processing execution unit
11 image processing unit
112 classifier
113 generator
12 storage unit
1P image processing program
121L machine learning library
122L classifier library
123L generator library
DG image data group
TDG training image data group
FTDG filtered training image data group
TDF, DF filter
SW switch

What is claimed is:

1. A learning method comprising:
using a machine learning model for image generation that is defined to, when any data is input, output specific image data and
a machine learning model for classification that is defined to, when image data output from the machine learning model for image generation or other image data is input, output a classification of the input image data,
using at least one of data for learning of classifier and data for learning of generator including both or either one of image data in which an amount of information for each component that is difficult to visually judge is reduced over an amount of information for other components and image data in which a noise component weighted according to vision is added at a predetermined ratio, and
learning at least one of the machine learning model for classification and the machine learning model for image generation by GAN.

2. The learning method according to claim 1, wherein
a loss function of the machine learning model for classification is calculated by giving data for learning of classifier that is at least one of image data obtained by reducing an amount of information for each component that is difficult to judge visually over an amount of information for other components in a predetermined ratio of both or either one of the image data output from the machine learning model for image generation and the other image data and image data obtained by adding a noise component weighted according to vision in the predetermined ratio of the image data, to the machine learning model for classifier, and
a loss function of the machine learning model for image generation is calculated by giving data for learning of generator that is the image data output from the machine learning model for image generation to the machine learning model for classification without any change.

3. The learning method according to claim 1, wherein
a loss function of the machine learning model for a generator is calculated by giving data for learning of generator that is at least one of image data obtained by reducing an amount of information for each component that is difficult to judge visually over an amount of information for other components in a predetermined ratio of both or either one of the image data output from the machine learning model for image generation and the other image data and image data obtained by adding a noise component weighted according to vision in the predetermined ratio of the image data, to the machine learning model for classification, and a loss function of the machine learning model for image generation is calculated by giving data for learning of generator that is the image data output from the machine learning model for image generation to the machine learning model for classifier without any change.

4. A non-transitory storage medium for recording a computer program that causes a computer to perform processes of:

storing therein definition data of a machine learning model for image generation that is defined to output specific image data when any data is input, and definition data of a machine learning model for classification that is defined to, when the image data output from the machine learning model for image generation or other image data is input, output a classification of an image based on the input image data;

performing both or either one of a process of reducing an amount of information for each component that is difficult to judge visually over an amount of information for other components and a process of adding a noise weighted according to vision for a predetermined ratio of the image data output from the machine learning model for image generation or the image data given to the machine learning model for classification; and learning the machine learning model for classification and the machine learning model for image generation by GAN.

* * * * *